May 28, 1968  L. K. SCHRADER  3,385,265
SANITIZING MILKING SYSTEM
Filed Feb. 3, 1966  3 Sheets-Sheet 1

INVENTOR.
LYLE K. SCHRADER
BY Herbert A. Minturn
ATTORNEY

United States Patent Office 3,385,265
Patented May 28, 1968

1

3,385,265
SANITIZING MILKING SYSTEM
Lyle K. Schrader, Dublin, Ind., assignor to Golay & Co., Inc., Cambridge City, Ind.
Filed Feb. 3, 1966, Ser. No. 524,735
4 Claims. (Cl. 119—14.18)

ABSTRACT OF THE DISCLOSURE

The device incorporates in one unit two milk receivers selectively used one alone or two together depending upon whether one or more cows are being simultaneously milked; a vacuum source; two sets of claws carrying each four teat cups and inflations; a pulsator in regular sequence intermittently stopping vacuum application through the cups to the teats of the cows; a water heater; a wash tank; a pump for selectively delivering milk from the receivers and wash water from the tank through the receivers, teat cup inflations, and the milk pipe to the bulk tank normally located remotely from the zone of milking. Tubing is provided to selectively set up the flows.

This invention pertains to a compact milking device created for the primary purpose of milking cows in the minimum time and with the expenditure of the minimum labor not only in the milking operation but also in the washing operation whereby milk may be had with a very low bacteria count.

In some instances, the permanent installation in a barn of the usually required milking and washing equipment involves the expenditure of quite a large sum of money which the small dairyman particularly hesitates to spend in view of a declining price milk market. This is particularly true in the situation of the renting farmer or dairyman who is not dairying on a large scale, but, for example, is milking twenty or less cows.

The device embodying the present invention is of a relatively small size, for example, one form being confined to a floor space approximately forty inches square and extends upwardly from the floor about sixty inches or less to the tops of milk receivers mounted on and above a base cabinet. The device is entirely complete and self contained with the exception of a bulk milk tank and a pipe line leading from adjacent the device to the tank. The device may be portable or fixed in position. Connections to water and electricity sources are required.

The device incorporates in one unit two milk receivers selectively used one alone or two together depending upon whether one or more cows are being simultaneously milked; a vacuum source; two sets of claws carrying each four teat cups and inflations; a pulsator in regular sequence intermittently stopping vacuum application through the cups to the teats of the cows; a water heater; a wash tank; a pump for selectively delivering milk from the receivers and wash water from the tank through the receivers, teat cup inflations, and the milk pipe to the bulk tank normally located remotely from the zone of milking. Tubing is provided to selectively set up the flows as will hereinafter be described, together with control valves.

The invention is described in detail with reference being made to the accompanying drawings, in which FIG. 1 is a front diagrammatic view in fragmentary section and with a housing outside wall removed of a structure embodying the invention;

2

Figure 1:
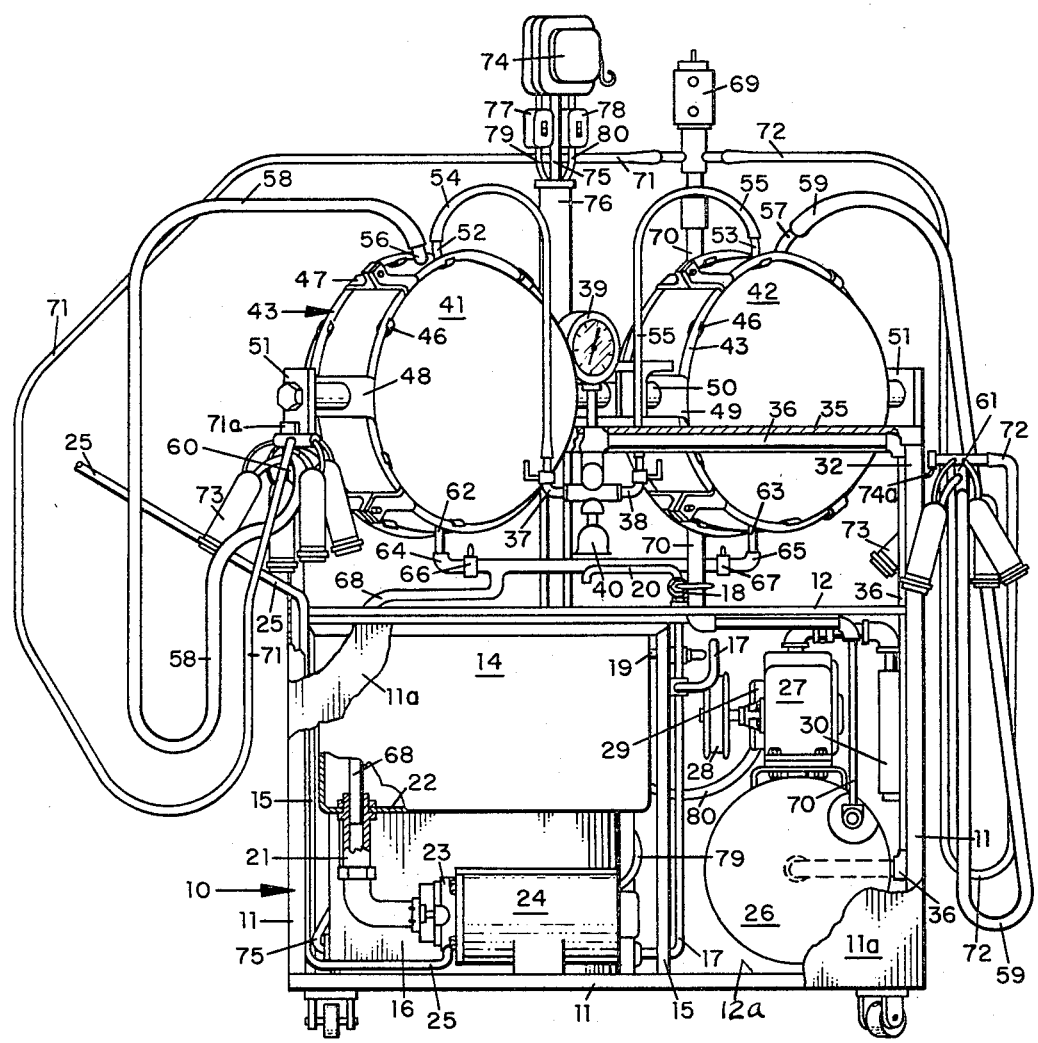
Figure 2:
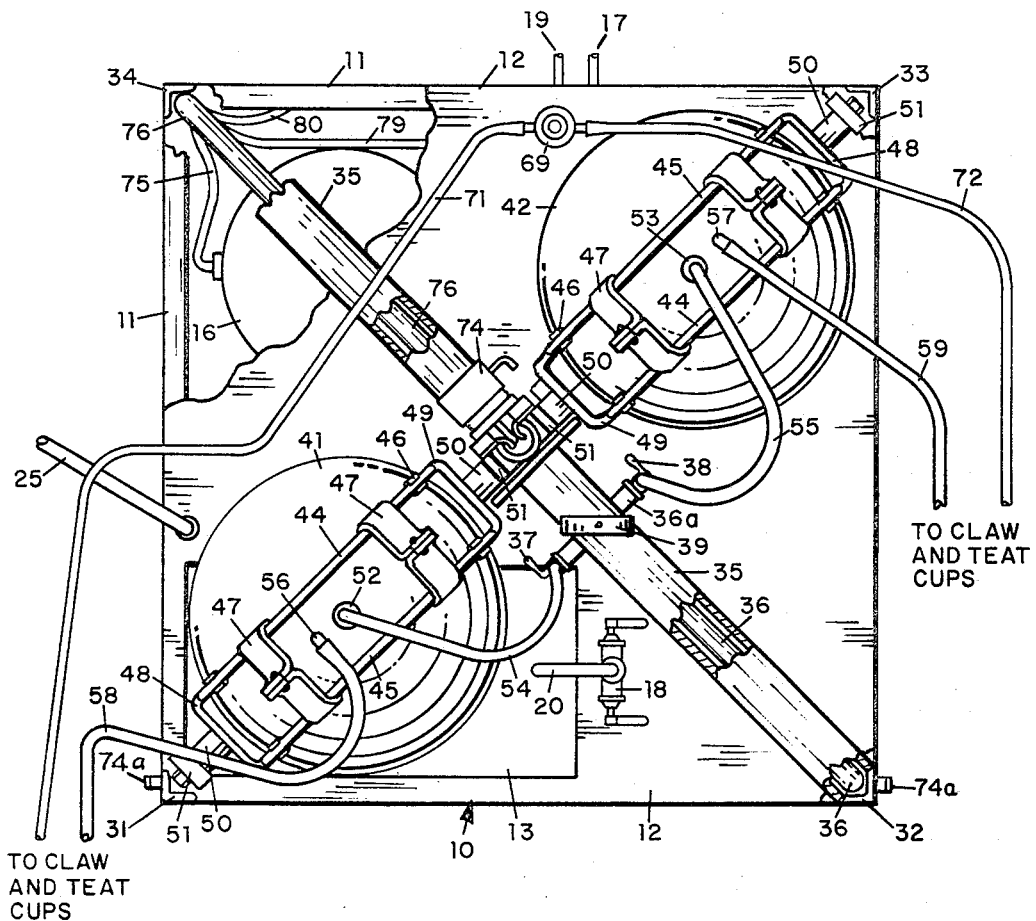
FIG. 2 is a top plan view in fragmentary section of the structure shown in FIG. 1.

A base cabinet 10 is formed from suitable structural elements 11 and an outside wall 11a, herein being shown as a hollow cube. The cabinet 10 has a fixed top 12 of a non-absorbent material, preferably polished stainless steel. There is an opening 13 through the top 12 located over a wash tank 14 which is supported on legs 15 within the cabinet 10, FIGS. 1 and 2.

A water heater 16 is mounted toward one corner of the cabinet 10. A cold water supply pipe 17 connects with the bottom portion of the heater 16 and is also connected to a faucet fixture 18 mounted above the top 12. A hot water pipe 19 leads from an upper portion of the heater 16 to the faucet fixture 18, whereby cold and hot water separately, or a mixture of cold and hot water may be selectively discharged into the wash tank 14 through the common nozzle 20. The tank 14 has a discharge pipe 21 leading from its bottom 22.

The tank discharge pipe 21 leads downwardly to the intake of a centrifugal pump 23 mounted on an electric drive motor 24. A fluid discharge pipe or tube 25 leads from the pump 23 upwardly to above the top 12. The top opening 13 may be provided with a cover (not shown).

A vacuum tank 26 is mounted within the cabinet 10 at one side of the heater tank 16 and of the motor 24. To conserve space, a vacuum pump 27 is mounted on top of the tank 26 and is driven through a belt 28 by an electric motor 29. Preferably, the pump 27, exhausting from the tank 26, discharges through a muffler 30 also confined within the cabinet 10.

Four posts 31, 32, 33 and 34 extend upwardly from the floor 12a, one at each corner of the cabinet 10. A bar 35, herein shown as an inverted channel iron, extends diagonally of the cabinet 10 thereover to be fixed at the upper portion of the posts 32 and 34. A vacuum pipe 36 leads from an end of the vacuum tank 26 upwardly along the frame member 11 and the post 32 and is carried under the bar 35 to a central zone thereof to connect therewith, either above or, as illustrated herein, below the bar 35, a lateral fitting 36a carrying at each end portion thereof a shut-off cock 37 and 38 respectively. A pressure gage 39 is interconnected to the pipe 36. A vacuum pressure control unit 40 is also interconnected to the vacuum pipe 36. Its internal construction does not per se constitute a part of the present invention.

A pair of milk receivers, herein shown as hollow spheres 41 and 42, preferably made of glass and graduated externally to indicate pounds of milk at various levels therein, are each carried within a harness generally designated by the numeral 43. This harness in each instance comprises a pair of circular members such as rods 44 and 45, each of less diameter than that of the spheres. Each rod 44 and 45 carries a plurality of resilient spacer blocks 46 spaced therearound.

The rods 44 and 45 of each pair 43 are respectively brought up on opposite sides of the spheres 41 and 42 and are tied together by the cross bands 47 to hold the rods in fixed spaced positions compressively urging the spacer blocks 46 against the surfaces of the spheres. There are trunnion brackets 48 and 49 extending across the rods 44 and 45 in each pair at opposite diametrical zones, and fixed to those rods. Each trunnion bracket 48 and 49 carries a trunnion 50 which, in turn, is revolubly carried by an upstanding block 51, those blocks 51 at the opposing trunnions 50 being extended upwardly from the diagonal bar 35, and those blocks at the outer sides of the spheres being carried by the posts 31 and 33. The two spheres 41 and 42 are thus rotatable on a common axis extending diagonally above and across the bar 35.

Each sphere 41 and 42 has respectively an air exhaust nipple 52 and 53 located on the normally top sides thereof. A flexible tube 54 interconnects the nipple 52 with the cock 37. A flexible tube 55 interconnects the nipple 53 with the cock 38. There are milk inlet nipples 56 and 57 respectively on the spheres 41 and 42 adjacent the nipples 52 and 53. Flexible tubes 58 and 59 interconnect respectively the nipples 56 and 57 with claws 60 and 61.

Each sphere 41 and 42 has, respectively, milk drain nipples 62 and 63 on the normally under sides. Flexible tubes 64 and 65 interconnect respectively through shut-off valves 66 and 67, a common flexible tube 68. This tube 68, during the milking operation, extends down into the wash tank to connect releasably with the drain pipe 21, FIGS. 1 and 2.

The usual pulsator unit 69 is carried on an upstanding pipe 70 which extends from the vacuum tank 26 to provide vacuum pressure at the unit. This unit 69 may be operated in the well known manner either electrically or by vacuum. A flexible tube 71 interconnects the unit 69 with the claw 60. A second flexible tube 72 interconnects the unit 69 with the claw 61. The claws 60 and 61 each carries teat cups 73 and, in the non-milking state, these cups 73 normally hang downwardly when the claws are carried by hanging them on hooks 74a on the posts 31 and 32, FIG. 1 and FIG. 2.

An electric service box 74 has an electric cable 75 leading from it down through a conduit 76 into the cabinet 10 and to the water heater 16 where it connects to the usual heating element therein. Also there are two switch units 77 and 78 below the box 74, which control flow of electricity through the cables 79 and 80, both being carried through the conduit 76 into the cabinet 10. The cable 79 connects with the pump motor 24 and the cable 80 connects with the vacuum pump motor 29. Thus, closing the service box 74 switch causes water to heat in the heater 16; closing the switch 77 starts the pump motor 24; and closing the switch 78 starts the vacuum pump motor 29.

Figure 3:
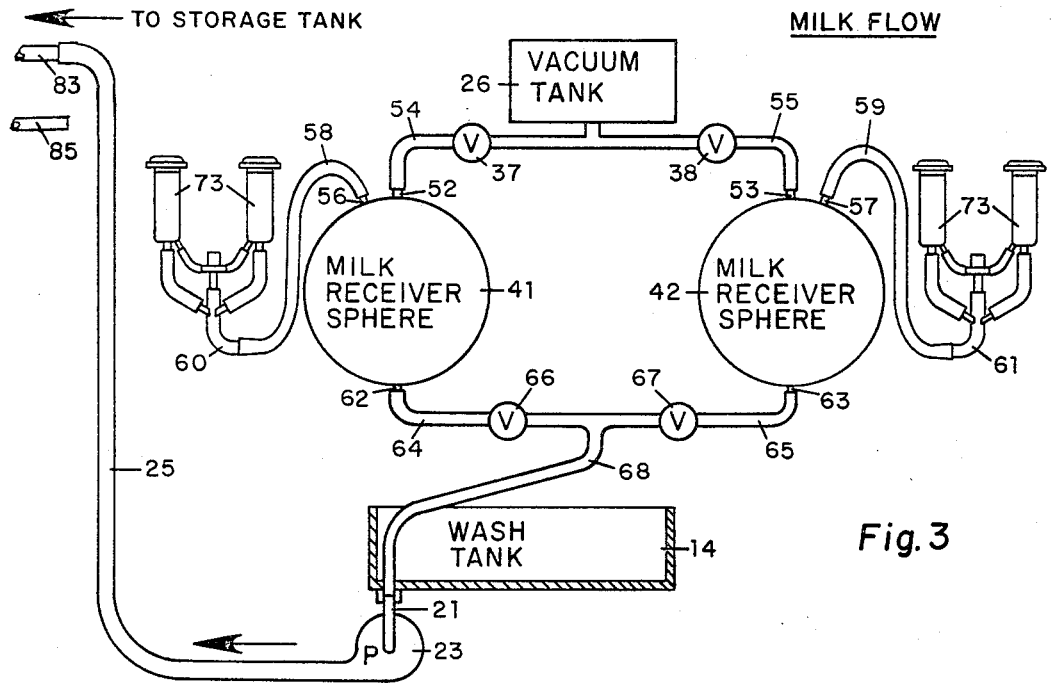
FIG. 3 is a milk flow diagram omitting the pulsating line.

The description so far discloses the structure set up for milking. Milk flows intermittently from the teat cups 73, through the tubes 58 and 59 when two cows are being milked simultaneously. The spheres or milk receivers 41 and 42 are both under vacuum pressure when both cocks 37 and 38 are open. Should only one cow be milked, then the milk will flow into the one sphere to which the tube from the set of teat cups is attached. Normally both shut-off cocks 66 and 67 are closed so as to retain the milk in the one or both spheres receiving milk. Observation of the character of the milk is had as the milk flows around the sphere inner surface. Reference is made to FIG. 3.

When the milk flow stops from one cow, the cock controlling the vacuum in the sphere having received that milk flow is first closed and then the cock controlling the discharge of milk from the sphere receiving that milk is opened. The milk will drain by gravity from the sphere through the tube 68 into the pipe 21. The motor 24 is set into operation by closing the switch 77 and the pump 23 will elevate the milk through the tube 25 to the line 83 to the storage tank (not shown). Of course, if more than the one cow is being milked the cock 66 may remain closed. The cock 67 will also be closed. Then upon completion of milking both cows, both cocks 37 and 38 are closed and both cocks 66 and 67 may be opened for draining both spheres 41 and 42.

Figure 4:
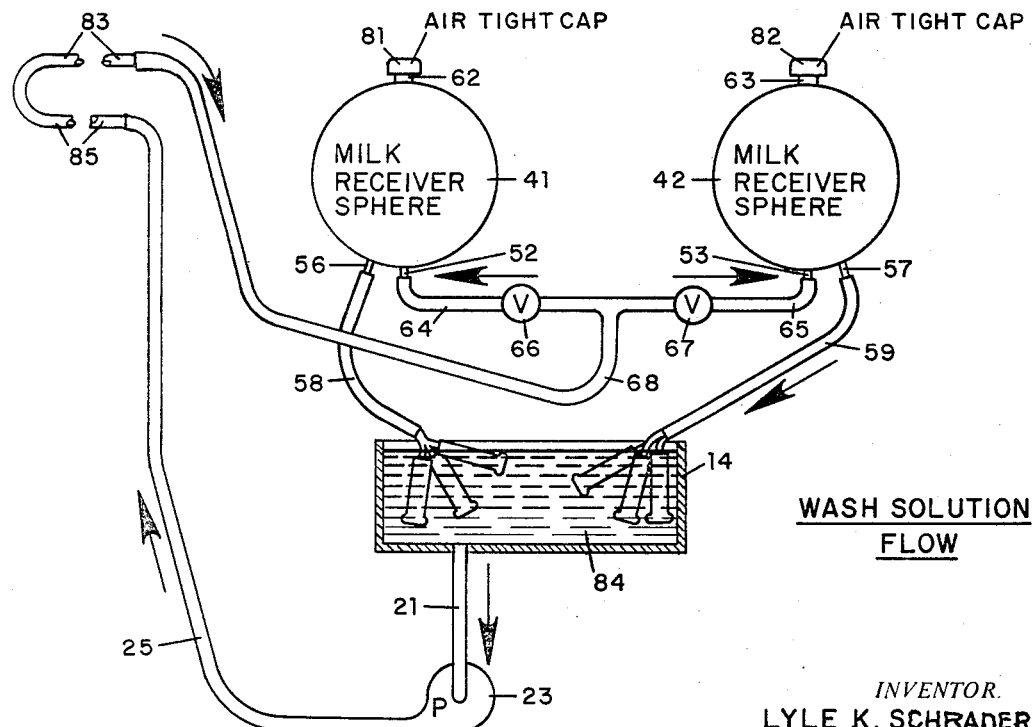
FIG. 4 is a wash water flow diagram also omitting the pulsating line.

The system should be promptly washed upon completion of the milking of the cows. Reference is made to FIG. 4.

The cocks 37 and 38 are closed. The tubes 54 and 55 are disconnected from the nipples 52 and 53. The tubes 64 and 65 are disconnected from the nipples 62 and 63 and connected with the nipples 52 and 53. The spheres 41 and 42 are rotated 180 degrees to bring the nipples 62 and 63 uppermost. Caps 81 and 82 respectively are sealably placed over the nipples 62 and 63. The tubes 64 and 65 with their intervening cocks 66 and 67 are interconnected respectively with the nipples 52 and 53 then on the undersides of the spheres 41 and 42. The tube 68 is withdrawn from the wash tank-to-drain connection and interconnected with a milk room return pipe 85 selectively connected to the milk line 83.

A washing solution 84 is placed in the wash tank 14 and the teat cups 73 still assembled on the claws 60 and 61 are placed in the tank 14 with the claws upwardly disposed. The motor 24 is energized by closing the switch 77 and the pump 23 takes the solution through its intake pipe 21 and delivers it through the tube 25, through the return line 85 and back through the normal milk flow line 83. The wash flow is then from this milk line 83 to be carried selectively into either sphere 41 or 42 or both through the tube 68, cocks 66, 67, and tubes 64 and 65. From the spheres 41 and 42, the wash solution returns through the tubes 58 and 59 and through the inflations within the teat cups 73 back to the tank 14, from which the flow as described may be continued until satisfactory cleansing of all surfaces with which the milk has been in contact. Of course the wash solution may finally be flowed from the tank by disconnecting the tube 25 from the line 83 and allowing the pump 23 to run dry. Within the various tubes and the spheres considerable turbulence of the solution is had through the flow to aid in washing away.

No mechanical milking device may be employed without being scrupulously made sanitary (substantially germ free, or free of milk accumulating spots where bacteria may multiply). The quicker the system is sanitized following the milking operation, the better the sanitizing step and the lower will be the bacterial count in the next following milking step.

Thus, for a complete acceptable milking operation there are two steps, the milking step and the sanitizing step. The means and method for conducting these two steps are successfully combined in the system above described. It is the ease in this system of sanitizing all of the parts with which the milk comes into contact which promotes the prompt sanitizing of those parts with the minimum amount of labor required, since the two steps are completely carried out in the one structural unit, the sanitizing step modifying the condition set up by the milking step.

While I have shown and described my invention in the one particular form, obvious relocations of units may be had and structural changes may be made without departing from the spirit of the invention and I therefore do not desire to be limited to that form beyond the limitations as may be imposed by the following claims.

I claim:

1. A sanitizing milking system comprising
   a supporting structure;
   fluid receiving vessels, rotatably supported by said structure to be in certain positions during a milking operation and rotated to common positions for sanitizing;
   means selectively interconnected with and evacuating said vessels;
   milking claws and teat cups connecting with said vessels;
   a fluid flow line interconnecting said vessels;
   valve means selectively interrupting flow in said flow line from either of said vessels;
   a second line leading from said flow line;
   a milk line;
   said second line being interconnected to said milk line for milk flow from said vessels;
   a return line interconnectable with said milk line remotely from the connection of said second line with said milk line;
   a wash tank adapted to hold a washing solution;
   a pump interconnected with said wash tank, upon rotation of said vessels;
   a pump discharge line connecting with said return line upon approximately 180 degrees of rotation of said vessels from said certain positions, to said sanitizing positions;

said claws being suspended in said wash tank for sanitizing while still connected with said rotated vessels; and said pump circulating said solution through said return line, said milk line, said second line, said fluid flow line, and said vessels following milking operation.

2. The structure of claim 1, in which said pump is interposed between said second line and said milk line for delivering milk from said flow line to said milk line.

3. The structure of claim 2 in which said pump discharge line connects said second line with said milk line during said milking operation; and said pump discharge line connects with said return line during the sanitizing operation.

4. The structure of claim 1, in which said second line connects through said tank with said pump wash tank interconnection.

References Cited

UNITED STATES PATENTS

| | | | |
|---|---|---|---|
| 2,608,951 | 9/1952 | Kingston | 119—14.11 X |
| 2,794,420 | 6/1957 | Recchia | 119—14.18 |
| 2,808,025 | 10/1957 | Graves | 119—14.18 X |
| 2,853,050 | 9/1958 | Golay | 119—14.46 X |
| 2,982,247 | 5/1961 | Varese et al. | 119—14.11 |
| 2,997,020 | 8/1961 | Barkman | 119—14.18 |
| 3,082,738 | 3/1963 | Golay | 119—14.46 |

HUGH R. CHAMBLEE, *Primary Examiner.*